United States Patent [19]

Shikinami

[11] 4,362,773
[45] Dec. 7, 1982

[54] FLOCKED FOAM WITH EMBOSSED PATTERN

[75] Inventor: Yasuo Shikinami, Osaka, Japan

[73] Assignee: Takiron Co., Ltd., Osaka, Japan

[21] Appl. No.: 163,138

[22] Filed: Jun. 26, 1980

[30] Foreign Application Priority Data

Jun. 26, 1979 [JP]  Japan .............................. 54-88128[U]
Nov. 9, 1979 [JP]  Japan ............................ 54-156060[U]
Nov. 21, 1979 [JP]  Japan ........................... 54-162385[U]

[51] Int. Cl.$^3$ ........................... B32B 3/26; B05D 1/06
[52] U.S. Cl. ..................................... 428/90; 156/73.1; 156/73.2; 156/209; 156/220; 156/273.3; 156/275.5; 204/159.14; 204/159.2; 427/26; 427/180; 427/200; 428/159; 428/212; 428/319.3; 428/319.9; 428/904
[58] Field of Search ..................... 156/73.1, 73.2, 78, 156/209, 219, 220, 273.3, 275.5; 427/180, 200, 26, 27, 32; 428/89, 90, 159, 212, 310, 315, 904, 319.3, 319.9; 204/159.14, 159.2

[56] References Cited

U.S. PATENT DOCUMENTS

| | | | |
|---|---|---|---|
| 3,917,883 | 11/1975 | Jepson | 427/200 X |
| 3,943,018 | 3/1976 | Petry et al. | 428/159 X |
| 4,029,840 | 6/1977 | Shikinami et al. | 428/904 X |
| 4,142,956 | 3/1979 | Shikinami et al. | 204/159.14 |
| 4,144,153 | 3/1979 | Shikinami et al. | 204/159.2 |
| 4,237,181 | 12/1980 | Tanabe et al. | 427/180 X |

*Primary Examiner*—Robert A. Dawson
*Attorney, Agent, or Firm*—Sughrue, Mion, Zinn, Macpeak & Seas

[57] ABSTRACT

A flocked foam having an embossed pattern provided by a high-frequency welder is disclosed. The foam comprises a partially cross-linked foam substrate (10 to 75% gel fraction in boiling toluene for 15 hours) formed from a 1,2-polybutadiene resin or a polymer blend including a 1,2-polybutadiene resin as one component thereof, and modacrylic pile fibers or a mixture thereof with other pile fibers flocked on the surface of the foam substrate.

10 Claims, 14 Drawing Figures

FLOCKED FOAM WITH EMBOSSED PATTERN

BACKGROUND OF THE INVENTION

1. Field of the Invention

This invention relates to a highly elastic and soft flocked foam which presents a pattern apparently having great depth and which has very good handle. More particularly, this invention relates to flocked foam having a sharp embossed pattern provided by a high-frequency welder and which consists of ridges and recesses of different colors (different hue) or of the same color but with different color depth (different tone of the same hue).

2. Description of the Prior Art

Artificial suede leather imitating natural buck skin and flocked goods having a handle and appearance made to resemble such artificial leather has been gaining acceptance in various applications such as garments, furniture and wall coverings. Various products have been developed, such as a soft flocked foam which comprises a soft substrate foam composed of plastic or rubber which is flocked with short synthetic fibers, typically made of rayon or nylon, to combine the softness of the substrate with the touch of the flock (also referred to as pile fibers) to provide good handle. Virtually none of the currently available rubber foams are ideal as a substrate for flocking. For example, soft polyvinyl chloride (PVC) and soft polyurethane foams commonly available in the market do permit flocking, but they have a number of defects when they are used as substrates for flocking.

The soft foam of PVC is produced by foaming a plasticizer-containing paste which can withstand a temperature of only about 70° C., and when such an adhesive for flocking is heat-cured or baked, the foam softens and fuses. To prevent this, an adhesive that can be heat-cured at a relatively low temperature, and which hence permits the use of low baking temperature is used (e.g., at 125° C. for 10 minutes; the soft PVC foam is generally lined with a layer of cloth that is sufficiently heat-resistant to withstand the baking temperature). But this method does not successfully provide a flocked product having satisfactory resistance to rubbing. While such a soft PVC foam substrate can be flocked in such a manner that a pattern comprising high ridges and deep recesses is provided, the platicizer oozes out of the substrate to cause various undesirable results, such as reduced bond strength between the flock and the substrate, toxicity of the plasticizer and the flocked product becoming hard at low temperature. The reduced strength of the bond between the flocks and the substrate causes many flocks to come off entirely or from the edges of ridges during an embossing operation. In addition, the smallness of the degree to which the soft PVC foam can expand often results in cracking occurring at the edges of ridges. For these reasons, such soft PVC foam can only provide an embossed flocked product of low quality which has no commercial value.

The soft polyurethane foam is generally an open-cellular foam which is composed of a resin having a three-dimensional structure, which therefore precludes embossing with heat. Furthermore, due to the absence of a skin, the binder enters the open cells and it is substantially at the cell walls that the foam is flocked, providing a flocked product that is low in fastness to rubbing. For these reasons, soft polyurethane foam is generally not capable of providing a flocked product suitable for embossing.

Other soft foams include a sponge of vulcanized rubber. But vulcanized rubber is intrinsically a heat-set product and is not amenable to embossing with heat. Besides, it is not used in a continuous sheet. Therefore, vulcanized rubber is not suitable for use as a substrate for a flocked foam product of this invention.

A foam is generally provided with an embossed pattern by passing it through hot rolls, pressing it with a hot press, or by treating it with a high-frequency welder. Hot rolls cannot provide a sharp, intricate and fine pattern. Using a hot press requires heating to a high temperature and cooling before demolding; hence, the cycle, consisting of setting the foam in a mold, heating it under pressure, and then cooling and demolding, takes an extended period of time, making quick embossing impossible. The use of a high-frequency welder is advantageous over these methods, in that it can quickly provide a sharp fine pattern in relief at a low temperature.

Embossing with a high-frequency welder makes use of the following principles: When an insulating material having polar groups in the molecule thereof is placed in an electric field of high-frequency, a periodic current flows to force the polar molecules into motion, such as rotation or vibration, thereby generating heat of friction between molecules. This means a work piece generates heat within itself, which enables even a thick-walled article to be heated quickly and uniformly throughout the depth of the article. The amount of heat generated varies with the type of work piece, the shape of the electrodes, the spacing between electrodes, the high-frequency voltage used, and the frequency used.

In using a high-frequency welder, a mold engraved with a desired pattern is fixed between electrodes contained in two parallel press plates, a work piece, such as a flocked foam, is placed so as to contact the engraved side of the mold, the press plates are closed and oscillated at high frequency for a short period of time (generally a few seconds), and the mold is removed to leave a foam having an embossed pattern on the flocked surface. Loss of the embossed pattern (i.e., return to original shape) can be prevented by cooling the mold to a temperature slightly lower than the softening point of the substrate resin of the foam before it is demolded. The usual method to shorten the overall welding cycle is to maintain the parallel press plates at a temperature slightly lower than the softening point of the foam substrate resin. In other words, the temperature elevated by high-frequency heating is reduced by cooling. Thus, embossing with a high-frequency welder uses the heat generated by the motion of the molecules of the resin, and that heat plasticizes the resin by elevating its temperature to higher than the softening point, at which the resin can be processed into a desired shape. It is therefore necessary that the resin be thermoplastic. A prerequisite for embossing is that the resin softens to a degree sufficient to work it into a desired shape (insufficient softening causes the loss of the pattern obtained in relief). The term "welding" as used herein means that adjacent portions of two or more thermoplastic resins are melted and bonded together by applying pressure. Thus, "welding with a high-frequency welder" as used herein means that the thermoplastic resins are melted by heating with a high-frequency welder, and then pressure is applied thereto to bond the thermoplastic resins. In this regard, the joined portion of the termoplastic resins are melt-bonded and unified completely. In welding thermoplastic resins, the resin must have a melting point such that it can be welded to another object because this phenomenon is necessary for the melting of the resin with heat and bonding to another object in the fused portion. The term "embossing" as used herein means that a pattern of ridges and recesses is provided to a foam substrate (or foam sheet); that is, the foam substrate is softened by heating and the softened foam cells are compressed and broken by applying a pressure and thereby a desired pattern of ridges and recesses is set on the foam substrate.

Most of the soft rubber foams and soft plastic foams that are conventionally used as substrates for flocked foam are not amenable to welding or embossing with a high-frequency welder. Of the two soft aforementioned foams, only the soft PVC foam can be welded or embossed using a high-frequency welder (but as also mentioned before, a commercially acceptable flocked PVC foam has not been produced thereby). The foam of 1,2-polybutadiene resin or a polymer blend containing such a resin as one component thereof generally precludes welding with a high-frequency welder, but it can be embossed with the machine. The reason is the 1,2-polybutadiene resin or the polymer blend containing such a resin as one component thereof is partially cross-linked before foaming, and the resulting foam retains some degree of thermoplasticity. Therefore, when heated, it softens but does not melt completely. Thus, it can be embossed but cannot be easily welded with a high-frequency welder. This property can advantageously be used for providing a flocked foam with an intricate pattern having more than one different level. If the resin is of such a nature that it can be welded, all stamped portion of the resin (i.e., a recess) melt to lose shape and the very small difference in the levels between a ridge and a recess is lost. In addition, the foam loses elasticity and becomes rigid.

As mentioned already, general purpose soft polyurethane foam with a dense three-dimensional structure does not soften and hence, it cannot be embossed.

Even if the foam substrate for flocking is amenable to embossing, the formation of an embossed pattern having well defined ridges and recesses is impossible if the flock materials to be impregnated in the substrate are not amenable to embossing. For example, rayon fibers, which do not soften to fuse under heating, or nylon fibers having high softening point (e.g., nylon stable softening at 180° C. or higher, and the filament of nylon 66, which softens at 230° to 235° C.) or a high melting point (e.g., the staple of nylon 6 melts at 215° to 220° C., and the filament of nylon 66 at 250° to 260° C.). The term "soften to fuse" as used herein means softening but not melting (i.e., heating to a temperature range of between higher than a softening point and lower than a melting point), and does not include the heating of the resin and/or the flock material to a temperature higher than its melting point that would cause welding of the resin and/or the flock material. If they are embossed at higher than their melting points, the resin and/or flock material solidify and become rigid upon cooling after the melting. This results in a product which is hard only in the recesses and has its flocked (i.e., sueded) surface impaired.

SUMMARY OF THE INVENTION

According to this invention, a flocked foam prepared by flocking a foam substrate comprising 1,2-polybutadiene resin or a polymer blend including a 1,2-polybutadiene resin as one component thereof with specific flocks of modacrylic fibers is provided with an embossed pattern consisting of ridges and recesses of different colors (i.e., different hue) or of the same color but with different color depths (i.e., different tone of the same hue). This treatment can be accomplished with a high-frequency welder within only a few seconds. The foam comprises a partially cross-linked foam substrate (10 to 75% gel fraction in boiling toluene for 15 hours) formed from a 1,2-polybutadiene resin or a polymer blend including a 1,2-polybutadiene resin as one component thereof. The difference in color (hue) or in depth of color (tone) between the ridge and recess provides the embossed pattern with a great degree of apparent depth. In addition, the resulting flocked foam has satisfactory handle. The foam of this invention is from 0.8 to 10 mm thick, has a foaming ratio (i.e., the volume after forming:volume before foaming) of from about 3:1 to 20:1, and preferably from 5:1 to 10:1 (compare this value with the foaming ratio of soft PVC foam which is as low as 2:1 to 3:1), and thus the depth of recess, the number of different levels, and the handle are easily controlled.

DETAILED DESCRIPTION OF THE INVENTION

In contrast to the prior art, a foam of a 1,2-polybutadiene resin or a polymer blend containing such a resin as one component thereof according to this invention is free from the defects described above. Instead, it has a high degree of softness and elasticity and presents good draping and insulating characteristics. A flocked product of this foam has very good handle and gives comfortably when touched or trod. A substrate foam which can be directly flocked with flocking material is a prerequisite for providing a long flocked foam which is suitable for use as carpet, wall covering, ceiling covering and other interior decorative materials used in long lengths. Needless to say, such long flocked foam presents an economic advantage in that it can be employed, without producing many waste pieces, as a material for small articles which require cutting to form a suitable shape.

The invention is more particularly described hereinafter by reference to the drawings.

Figure 1:
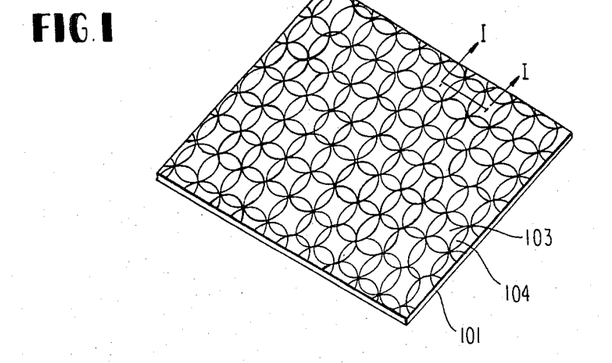
FIG. 1 is a perspective view of roll-embossed flocked soft PVC foam.
Figure 2:
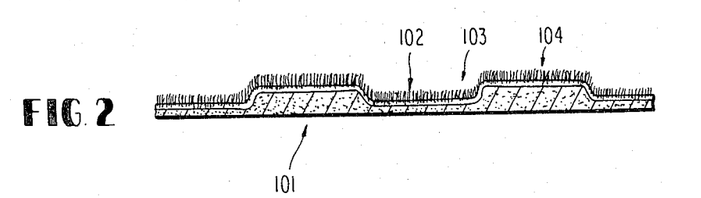
FIG. 2 is a schematic enlarged sectional view of the part of the foam of FIG. 1 cut between the lines I—I of FIG. 1.

FIG. 1 is a perspective view of an embossed flocked foam comprising a soft polyvinyl chloride resin. FIG. 2 is a schematic enlarged sectional view of the part of the foam cut between the line I—I of FIG. 1. In the figures, 101 is a foam substrate made of a soft polyvinyl chloride resin, and 102 is rayon flocks (i.e., flocking material) or nylon flocks. As shown, the flocked foam provided with an embossed pattern by roll embossing comprises a recess 103 and a ridge 104 where all flocks 102 stand erect, and the embossed pattern lacks apparent depth and sharpness. The foam substrate melts to such a degree that it loses its inherent flexibility and softness, and the resulting product is not commercially acceptable.

Figure 3:
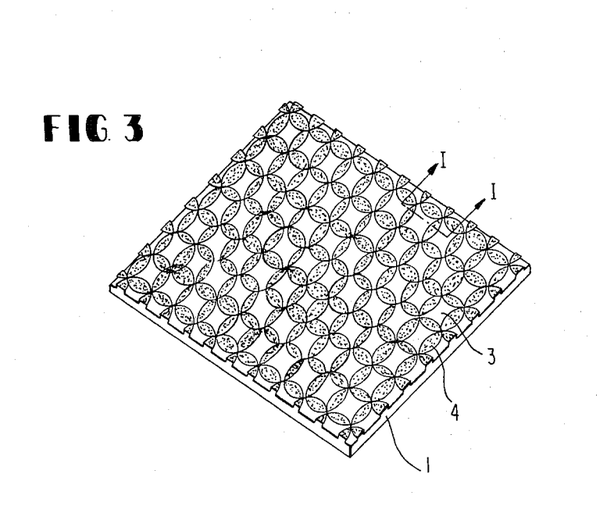
FIG. 3 is a perspective view of one embodiment of the flocked foam provided with an embossed pattern according to this invention.
Figure 4:
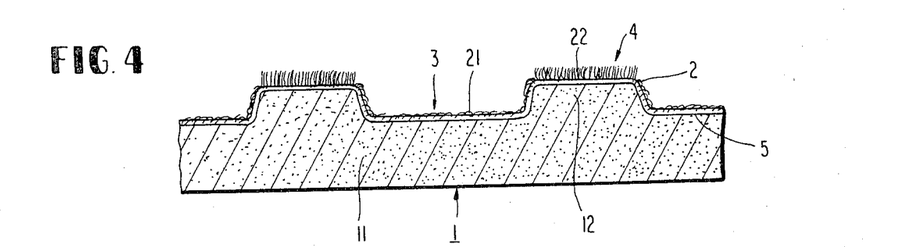
FIG. 4 is a schematic enlarged sectional view of the part of the foam cut between the lines I—I of FIG. 3.

FIG. 3 is a perspective view of one embodiment of the flocked foam provided with an embossed pattern according to this invention. FIG. 4 is an enlarged schematic sectional view of the part of the foam cut between the lines I—I of FIG. 3. In these figures, 1 is a substrate composed of the foam of 1,2-polybutadiene resin or a polymer blend containing such resin as one component thereof, and 2 is flocks made of modacrylic fibers.

As illustrated in FIGS. 3 and 4, this invention is a flocked foam which has on its surface an embossed pattern (e.g., of floral and lattice design, or any other suitable design) which is imparted by a high-frequency welder. The embossed pattern comprises recesses 3 and ridges 4 that have great difference in level and, as will be described hereunder, have different colors (different hue) or have the same color of different depth (different tone of the same hue), and help present the pattern with a very clear-cut contour. Such flocked foam with an embossed pattern can be produced by intermittently supplying an unpatterned flocked foam material [as schematically illustrated in FIG. 5(a), 6(a), 7(a), 8(a) or 9(a)] into a high-frequency welder which carries a mold having a surface engraved with a desired pattern, and by pressing the mold against the flocked surface of the material to achieve embossing simultaneously with the formation of two different colors (different hue) or the formation of different depths of the same color (different tone of the same hue).

The flocked foam illustrated in FIG. 3 is provided with an embossed pattern of floral and lattice design by treatment with a high-frequency welder in the manner described above. As schematically shown in FIG. 4, the flocks 21 in the recess 3 that has been pressed with the mold soften to fuse with each other and come flat, but the flocks 22 on the ridge 4 remain uncrushed by the mold and stand erect. In addition, since the flocks 21 in the recess 3 are softened and fused to the substance, they have high resistance to scratching and will not soon return to upright position. Therefore, the flocked foam provides a beautiful sueded surface having apparent depth, with the recesses 3 where flocks lie flat being deep in color (deep tone) and the ridges 4 where flocks stand erect being light in color (light tone). In the recessed portion of the substrate 11, adjacent cell membranes are fused to each other, leaving cells crushed to some degree, but on the other hand, because of the partial cross-linking of the substrate, a considerable number of cells remain uncrushed, and they are simply deformed under compression. Therefore, although the recessed portion 3 of the foam substrate 11 is less cellular than the ridged portion 12 of the substrate, it still remains highly soft and elastic and exhibits good cushioning properties, producing good handle. The good handle is partly due to the use of flocks comprising modacrylic fibers from about 0.5 to 1.5 mm long and from 0.7 to 3.0 deniers thick, which match the foam substrate best.

The flocked foam of this invention is also characterized by an embossed pattern having recesses that penetrate deep into the foam substrate 11, as shown in the drawings, and which greatly differ in level from the ridges. It can be easily understood that the great difference in level between ridges and recesses combines with their difference in color (different hue) or difference in the depth of color (different tone) to provide an embossed pattern which has a great degree of apparent depth under visual observation. In contrast, if flocked paper or cloth is subjected to high-frequency embossing, the pressed part of the paper (or cloth) loses the original handle, become rigid, and the difference in level between ridges and recesses is so much smaller than that in the embossed foam of this invention that the resulting pattern lacks apparent depth.

EXAMPLE

A coating of two-pack cross-linkable polyurethane adhesive of solvent type was applied with a reverse coater to a foam made of a 1,2-polybutadiene resin available from Japan Synthetic Rubber Co., Ltd. under the trade name "RB 820". The foam had a foaming ratio of 5:1, a thickness of 1.0 mm and a width of 1 m. The foam was then laminated with a piece of cloth (rayon jean). A doctor knife was used to apply the coating of a reactive acrylic ester adhesive of emulsion type (available from Teikoku Kagaku Sangyo Co., Ltd. under the tradename of "Teisan Resin A-250") to the foam in a dry weight of about 100 g/m$^2$. The foam was flocked with short dyed modacrylic fibers (1.0 mm long, 2.0 deniers in thickness, available from Kanegafuchi Chemical Industry Co., Ltd. under the trade name "Kanekaron") by the down-method (voltage: 45,000 volts, flocking rate: 5 m/min). In the "down-method", pile fibers (flocks) fall from a position above the foam substrate to be flocked; while falling, the fibers pass through an electric field and are thereby charged electrostatically and then the charged fibers are flocked on the upper surface of the foam substrate. The foam was fed into a drying oven where it was preliminarily heated at 90° C. for 5 minutes and baked at 135° to 140° C. for 10 minutes to have the flocks firmly set in the foam.

The foam was cooled and brushed to remove excess flocks. It was then subjected to embossing with a high-frequency welder (made by Yamato Rinita Co., Ltd.) to provide a desired raised pattern: a zinc mold having one surface engraved with the desired pattern was fixed to the upper plate of a high-frequency press having electrodes incorporated therein. The press plates were preheated to 80° C. and the mold to the same temperature. The temperature was equal to the softening point of the foam and it was high enough to prevent the loss of the shape (i.e., return to original shape) once imparted to the foam. The flocked foam was supplied to the position right under the mold, the press plates were closed and pressurized (ram pressure: 100 kg/cm$^2$), and immediately thereafter, they were oscillated at 27.1 MHz for a certain period (generally in the range of from 2 to 5 seconds) and cooled to the mold temperature which was maintained for 2 to 3 seconds. The press was opened and the foam now provided with an embossed pattern was fed forward by a mold pitch (the period of the embossing cycle was generally about 10 seconds). Such intermittent embossing operations using known techniques to avoid the formation of a visible boundary between repeated unit patterns, provided a flocked foam having an embossed pattern comprising endlessly repeating unit patterns.

The substrate 1 is made of the foam of a 1,2-polybutadiene resin or a polymer blend including such a resin as one component thereof. Such a butadiene resin includes various types, that ranges from liquid types having low molecular weight to those of high crystallinity having no processability. For the purposes of this invention, a 1,2-polybutadiene resin that contains more than about 70% of 1,2-bonds, has a molecular weight of more than 100,000, a crystallinity of from 10 to 50%, and more than 20% of syndiotactic stereo-specificity is preferred in view of its high heat stability, processability and light-sensitivity properties. Details of this type of foam are described in U.S. Pat. Nos. 4,144,153 and 4,142,956. The 1,2-polybutadiene resin may be blended with a polymer which is preferably miscible with the resin and has a softening point relatively close to that of the resin. Examples of such polymers include vinyl acetate/olefinic, vinyl alcohol/olefinic, and acrylic ester/olefinic vinyl copolymers containing more than about 10 mol% of a polar component such as vinyl acetate. A polymer blend containing such polar polymer provides a foam which is suitable for embossing with a high-frequency welder and which can be embossed in a reduced embossing cycle. Particularly preferred polar polymers are vinyl acetate/olefinic polymers, and vinyl acetate/ethylene copolymer is most preferred. A polymer blend containing the last mentioned copolymer provides a foam having very good handle which is best suited to embossing with a high-frequency welder. Such polymer is preferably blended with the 1,2-polybutadiene resin at a weight ratio of from 3:7 to 7:3 (based on the weight of the resin). If the content of the polar polymer is too low, the improvement in the suitability of the resulting foam to embossing with a high-frequency welder is not as great as desired, and if the content is too high, the resulting foam loses the original handle and becomes sticky. If desired, another polymer may be incorporated additionally in the blend to provide a foam having controlled handle. Suitable examples of such additional polymer are those which are miscible with both the 1,2-polybutadiene resin and the polar polymer and which have a softening point relatively closer to those of these polymers; they include polyolefins such as polyethylene, polypropylene and polybutene. Such additional polymer is used in an amount of from 0 to 30 parts by weight per 100 parts by weight of the 1,2-polybutadiene resin or a polymer blend thereof with the polar polymer.

The above-described 1,2-butadiene resin or a polymer blend having such resin as one component is foamed by a known method to provide the foam substrate for use in this invention. Since the 1,2-polybutadiene resin is sensitive to ultraviolet radiation, a foam is preferably prepared from such resin by first partially cross-linking it in the form of a mixture with other additives such as blowing agent (to such a degree that the gel fraction is 10 to 75% in boiling toluene for 15 hours as described in U.S. Pat. Nos. 4,144,153 and 4,142,956) and then decomposing the blowing agent. This foaming is specifically described hereunder: A mixture of the above defined 1,2-polybutadiene resin or polymer blend thereof with a photosensitizer and a blowing agent, and optionally an anti-aging agent or colorant is continuously extruded from an extruder to provide a thin continuous sheet. The sheet is irradiated with ultraviolet rays (240 to 400 μm) in a short period of time at a controlled dose rate to provide a partially cross-linked 1,2-polybutadiene resin. The sheet is then heated to higher than the decomposition point of the blowing agent to provide an expanded foam. The foaming ratio and handle of the foam can be controlled by varying the amounts of the blowing agent and the photosensitizer used, the dose of ultraviolet radiation, and other foaming conditions. A preferred foam for use in this invention has a thickness of 0.8 to 10 mm, more preferably from 0.8 to 5 mm, and most preferably from 0.8 to 1.5 mm. The foaming ratio is in the range of from 3:1 to 20:1, preferably from 5:1 to 10:1.

The pile fibers to be used in this invention that comprise modacrylic fibers generally have a softening point of about 150° C., but they soften at about 120° C. to the degree necessary for embossing or providing the desired shape. They do not have a sharp melting point. The relatively low softening point, the absence of a sharp melting point, and susceptibility to high frequency because of the presence of a high proportion of polar groups in the molecule are very advantageous properties for providing a flocked foam with good handle and well-defined and complex embossed patterns. Therefore, with all the above characteristics being taken into account, the foam of 1,2-polybutadiene or a polymer blend including such a 1,2-polybutadiene resin as one component thereof can be flocked with modacrylic fibers and subjected to embossing to provide a flocked foam with an embossed pattern that has been unobtainable with the prior art.

The flocks to be used in this invention can comprise modacrylic fibers that are made from a long-chain polymer containing 35 to 85% of acrylonitrile. From the viewpoint of the ease of embossing, modacrylic fibers having a great degree of polarity and which soften at low temperature are preferred. Typically, such modacrylic fiber consists of 35 to 85% of acrylonitrile and 65 to 15% of vinyl chloride. Both monomers are polar components that can make a fire-retardant fiber of long-chain polymer. A particularly preferred fiber comprises 50% of acrylonitrile and 50% of vinyl chloride. Such fiber generates a large amount of internal heat in an electromagnetic field at high frequency and it softens at a temperature as low as about 150° C. When it is subjected to embossing with a high-frequency welder, the flocks in the area pressed by the welder adapter or the projecting portion of the mold (i.e., the recess in an embossed pattern) soften to fuse together in only few seconds, and all of the flocks become flat. To provide a flocked foam with good handle the flocks to be used should comprise the longest and finest possible modacrylic fibers, but the fact is such ideal fibers are hard to obtain. Therefore, this invention preferably uses modacrylic fibers having a length of about 0.5 to 1.5 mm and a thickness of about 0.7 to 3.0 denier. Flocks comprising fibers of such dimensions match the softness and cushioning properties of the sheet substrate, and provide a product with hand feeling as it if were composed of much longer flocks. Such effect can be obtained neither from longer and thicker flocks or from shorter and finer ones.

There is no particular limitation on the method of flocking modacrylic, nylon or rayon fibers, and a conventional method can be used in this invention. According to one example, a coating of a flocking adhesive, such as a reactive polyacrylic ester emulsion, that forms strong bond with the foam substrate is applied to the surface of the substrate with a suitable tool, e.g., doctor knife, in a dry weight of from about 50 to 200 g/m². The substrate is flocked with modacrylic, nylon or rayon fibers electrostatically by either the previously mentioned down-method or the up-method at a voltage higher than about 30,000 volts. In the up-method, pile fibers are electrostatically charged and then flocked on the lower surface of the foam substrate, being attracted to the substrate due to electrostatic force. The foam is dried preliminarily at from about 80° to 110° C. for from about 5 to 6 minutes before it is baked at from about 110° to 145° C. for a period of from about 2 to 10 minutes. The substrate need not be flocked throughout and it is to be understood that only a desired part of its surface may be coated with a flocking adhesive and flocked with piles.

The endless flocked foam wherein the foam substrate made of the above defined 1,2-polybutadiene resin or polymer blend having such resin as one component is impregnated with the flocks described above is supplied intermittently into a high-frequency welder that carries a mold having a surface engraved with a desired pattern, and the mold is pressed against the flocked surface to thereby provide the desired pattern in relief. In particular, modacrylic flocks that contain a polar component generate internal heat and obtain the temperature necessary for embossing in a very short period of time. Therefore, an embossing operation generally requires from several seconds up to several tens of seconds. All frequencies for the high frequency welder can be used (e.g., 27.12 MHz, 40.46 MHz and 41.14 MHz permitted in Japan under the Radio Wave Control Low of Transport Ministry can be used), and the power output may be selected from the range of from 1 to 100 kilowatts depending upon the area of the recess in the desired pattern in relief.

This invention is hereunder described in greater detail by reference to the first to fifth embodiments thereof. For the purpose of clarity, the figure numbers keyed to the respective embodiments, the substrates and the flocks used in the embodiments are set forth in the following table.

TABLE

| Embodiment No. | FIG. No. | Substrate | Flocks |
|---|---|---|---|
| 1 | 5 | the foam of 1,2-polybutadiene resin or a polymer blend containing the same as one component | modacrylic fiber |
| 2 | 6 | the foam of 1,2-polybutadiene resin or a polymer blend containing the same as one component | modacrylic fiber; and flocks that do not soften to fuse with high-frequency welder |
| 3 | 7 | the foam of 1,2-polybutadiene resin or a polymer blend containing the same as one component | modacrylic long fiber; and short flocks that do not soften to fuse with high-frequency welder |
| 4 | 8 | the foam of 1,2-polybutadiene resin or a polymer blend containing the same as one component | long modacrylic fiber; and short modacrylic fiber having different color(hue) that long one |
| 5 | 9 | the foam of 1,2-polybutadiene resin or a polymer blend containing the same as one component | long modacrylic fiber; and short modacrylic fiber of the same color(hue) |

Figure 5A:
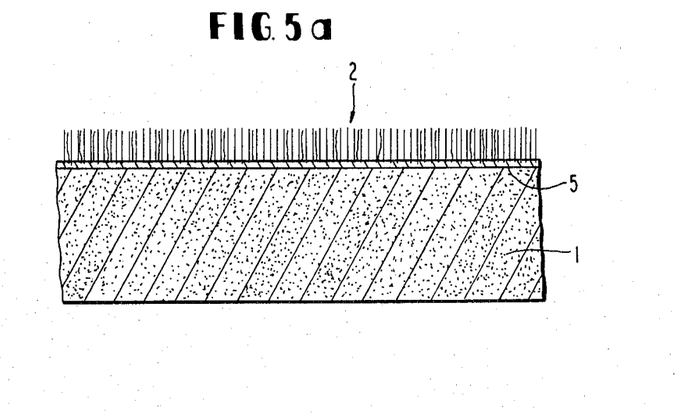
FIG. 5(a) is an enlarged schematic sectional view illustrating one example of the flocked foam material to be used in this invention.
Figure 5B:
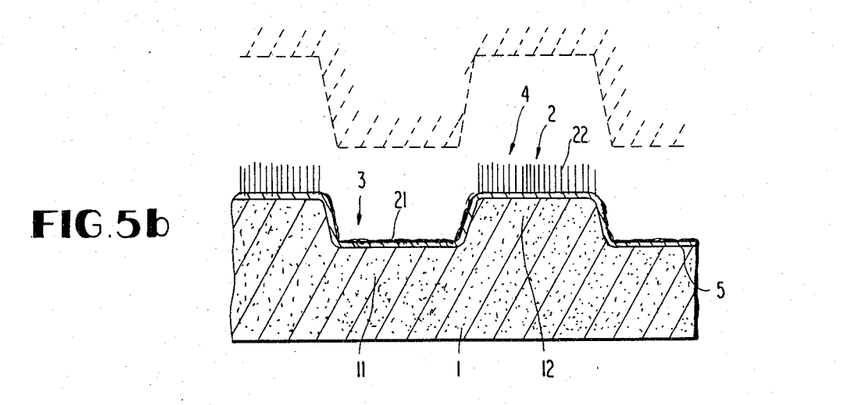
FIG. 5(b) is an enlarged schematic sectional view of the flocked foam of this invention prepared from the material of FIG. 5(a).

FIG. 5 shows the first embodiment of this invention. FIG. 5(a) shows an unpatterned flocked foam which comprises a substrate 1 made of the foam of a 1,2-polybutadiene resin or a polymer blend containing such resin as one component, said substrate being covered uniformly with flocks 2 of modacrylic fiber by a flocking adhesive 5. FIG. 5(b) is an enlarged schematic sectional view of a flocked foam embossed with a high-frequency welder to provide a raised pattern of floral and lattice design. As shown schematically in FIG. 5(b), the substrate 1 gives in a portion 3 which is pressed by the embossing mold in the high-frequency welder, and forms a deep recess in the substrate. As a result, the flocks 21 in the recess 3 soften to fuse with each other and become flat, but the flocks 22 on the ridge 4 remain uncrushed with the mold and stand erect. Therefore, the resulting flocked foam provides a beautiful suede surface having different tones of color, with the recesses 3 where the flocks 21 lie flat being deep in color (generally, the erect flocks cast a shadow depending upon their height and make the recesses look deep in color (tone), but in the recesses one sees only the lateral side of flat flocks, and depending on the direction from which light come, they may appear lighter in color (tone) than the erect flocks; this is often observed in a suede surface and it produces an interesting variation in tone which is often considered attractive by consumers) and the ridges 4 where the flocks 22 stand erect being light in color (tone). This contrast in tone, coupled with the great difference in level between the ridge 4 and the deep recess 3 in the substrate, provides a flocked foam sheet of high commercial value that is provided with a clear-cut pattern having apparent depth under visual observation.

Figure 6A:
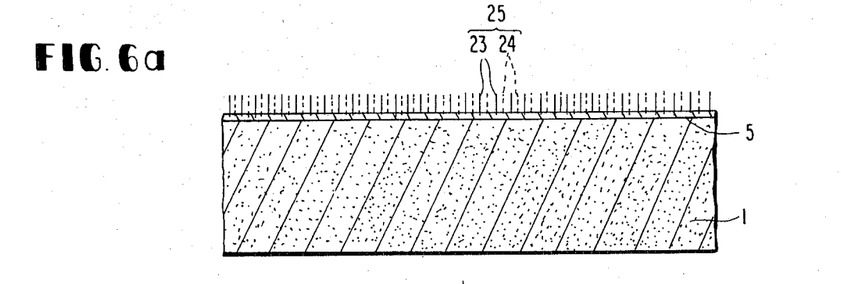
FIG. 6(a) is an enlarged schematic sectional view showing another example of the flocked foam material for use in this invention.

FIG. 6 shows the second embodiment of this invention. FIG. 6(a) shows an unpatterned flocked foam which comprises a substrate 1 made of the foam of a 1,2-polybutadiene resin or a polymer blend containing such resin as one component, said substrate is flocked with a uniform pile mixture 25 by a flocking adhesive 5. The pile mixture 25 comprises flocks 23 of modacrylic fiber and flocks 24 that are of different color (hue) than the flocks 23 and which do not soften to fuse with a high-frequency welder. The flocks 23 and flocks 24 are of substantially the same length, and the overall pile layer produces a color just between the color of the flocks 23 and that of the flocks 24.

Figure 6B:
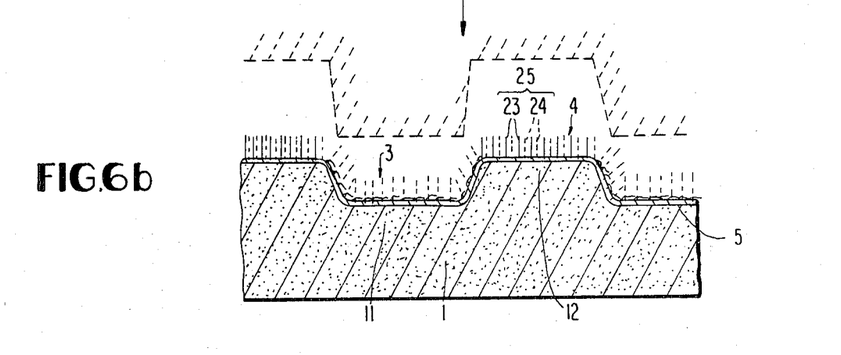
FIG. 6(b) is an enlarged schematic sectional view of the flocked foam of this invention prepared from the material of FIG. 6(a).

When such flocked foam material is subjected to embossing with a high-frequency welder, both the substrate 1 and flocks 23 produce internal heat, and as shown in FIG. 6(b), adjacent cell membranes in the part of the foam substrate 1 that has been pressed with the projecting portion of the mold fuse with each other to crush some cells to thereby form a recess 11 in which flocks 23 soften to fuse and lie flat. As a result, only flocks 24 that do not soften to fuse with the high-frequency welder remain erect in the recess 11, and the flat flocks 23 that are substantially concealed by the erect flocks 24 are hardly visible. This results in the color of the erect flocks 24 which is substantially intensified over the color of the flocks 23 in the recess 11 (but depending on the mixing ratio of flocks, the color of flat flocks may be intensified). In contrast, the flocks 23 on the ridge 12 which have not been pressed by the mold do soften to some degree as a result of internal heat generation, but they remain erect because they are not affected by the mold. This means that both flocks 23 and 24 stand erect on the ridge 12 and present a color which varies little from the color produced by mixing their colors before the embossing treatment.

In the way described above, this invention uses a high-frequency welder to achieve embossing simultaneously with the changing of the color (hue) of the flocks in the recess 11, and provides a flocked foam with a raised pattern which comprises the ridge 12 having the color obtained by mixing the flocks 23 and 24 and the recess 11 having the color of the flocks 24 substantially intensified over the color of the flocks 23. As a result, the recess 11 is sharply distinguished from the ridge 12 on the boundary, thus providing a two-colored pattern in relief with a clear-cut contour.

It is to be understood that neither flocks 23 nor 24 are limited to those of a single color (hue); each of them may comprise more than one set of flocks having dissimilar colors to enable fine adjustment of the color.

The flocks 24 that do not soften to fuse with a high-frequency welder are made of synthetic fibers, such as rayon or nylon fibers, having 0.5 to 1.5 mm long and 0.7 to 3.0 denier. For details of the application of the coating of an adhesive, flocking of pile fibers and the embossing with a high-frequency welder, see Example described hereinabove.

FIG. 7 shows a third embodiment of this invention.

Figure 7A:
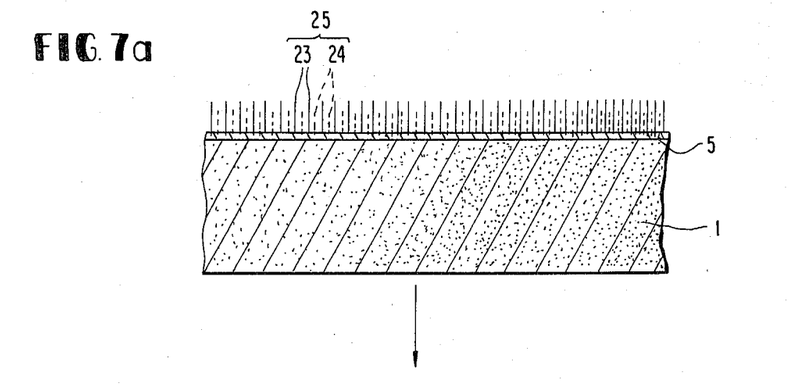
FIG. 7(a) is an enlarged schematic sectional view showing still another example of the flocked foam material to be used in this invention.
Figure 7B:
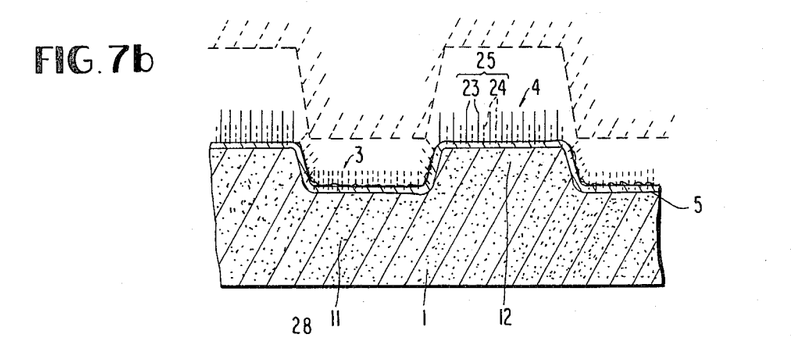
FIG. 7(b) is an enlarged schematic sectional view of the flocked foam of this invention prepared from the material of FIG. 7(a).

FIG. 7(a) shows another flocked foam material for use in this invention, and it is so constructed that when it is embossed with a welder, the resulting recess and ridge portions present far greater contrast by color difference (hue difference) than obtained using the foam material shown in FIG. 6(a). The foam material of FIG. 7(a) is identical to the material of FIG. 6(a) except that the flocks 23 of modacrylic fiber are longer than the flocks 24 that do not soften to fuse by a high-frequency welder. With such material, the long flocks 23 substantially conceal the short flocks 24, providing a flock layer wherein the color (hue) of the long flocks 23 is substantially intensified over the color (hue) of the short flocks 24. FIG. 7(b) shows the flocked foam of this invention that is produced by embossing such flocked foam material with a high-frequency welder. Like the product shown in FIG. 6(b), both the piles 23 and 24 stand erect on the ridge 12, whereas only the flocks 24 that do not soften to fuse by the welder stand erect in the recess 11. As a result, in the ridge 12, the color (hue) of the long flocks 23 is substantially intensified over the color (hue) of the flocks 24, and in the recess 11, only the color (hue) of the erect piles 24 is visible, thus providing an ever sharper pattern with a higher contrast between the colors (hues) of the recess 11 and ridge 12. If the flocks 24 that do not soften to fuse by high-frequency are longer than the flocks 23, a pattern with low contrast between the colors (hues) of the recess and ridge is produced.

The above-described third embodiment of this invention uses a substrate, pile fibers and flocking adhesive each identical with what is used in the first and second embodiments. For details of the application of the coating of an adhesive, flocking of the pile fibers and the embossing with a high-frequency welder, see the Example described hereinabove.

Figure 8A:
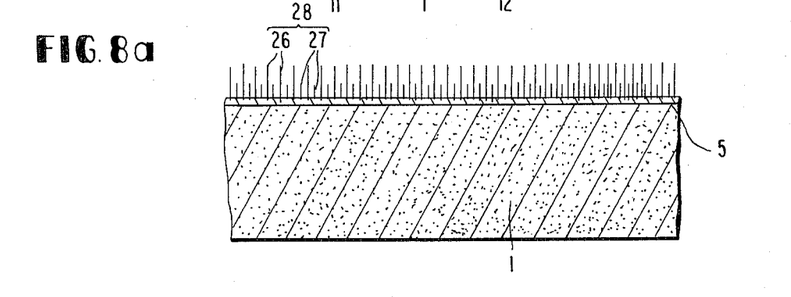
FIG. 8(a) is an enlarged schematic sectional view showing a further example of the flocked foam material for use in this invention.

FIG. 8 shows a fourth embodiment of this invention. FIG. 8(a) shows a flocked foam material which comprises a substrate 1 made of the foam of 1,2-polybutadiene resin or a polymer blend having such a resin as one component; said substrate if flocked with a pile mixture 28 by a flocking adhesive 5. The pile mixture consists of long flocks 26 of modacrylic fiber, and short flocks 27 of another modacrylic fiber having a different color (hue) than that of the flocks 26. The short flocks 27 are substantially concealed by the long flocks 26 and are hardly visible. As a result, the overall flock layer is such that the color (hue) of the long flocks 26 is intensified over the color (hue) of the short flocks 27.

Figure 8B:
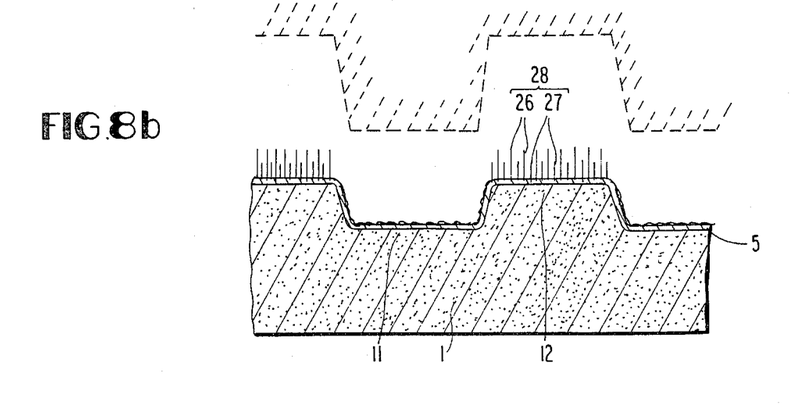
FIG. 8(b) is an enlarged schematic sectional view of the flocked foam of this invention prepared from the material of FIG. 8(a).

When such flocked foam material is subjected to embossing with a high-frequency welder, both the substrate 1 and the pile mixture 28 produce internal heat, and as shown in FIG. 8(b), adjacent cell membranes in the part of the foam substrate 1 that has been pressed with mold partially fuse with each other to crush some cells to thereby form a recess 11 in which the pile mixture 28 softens to fuse and become flat. If the pile mixture 28 in the recess 11 becomes flat, the short flocks 27 that have been hardly visible to the eye come to be exposed between long flocks 26. Hence, the flock layer in the recess 11 assumes the color (hue) produced by mixing the colors (hues) of the long flocks 26 and short flocks 27. On the other hand, the pile mixture 28 on the ridge 12 which has not been pressed by the mold do soften and fuse to some extent as a result of internal heat generation, but it still remains erect and retains the original color (hue) of the flock layer (i.e., the color (hue) before the embossing).

In the way described above, this invention uses a high-frequency welder to achieve embossing simultaneously with the changing of the color (hue) of the flocks in the recess 11, and provides a flocked foam with a raised pattern which comprises the ridge 12 having the color (hue) of the long flocks 26 and the recess 11 having the color (hue) obtained by mixing the long flocks 26 with the short flocks 27. As a result, the recess 11 is sharply distinguished from the ridge 12 on the boundary, thus providing a two-colored pattern (two hues) in relief with a clear-cut contour.

It is to be understood that neither flocks 26 nor 27 are limited to those of a single color (hue); each of them may comprise more than one set of flocks having dissimilar colors (hues) to enable fine adjustment of color (hue).

The above-described fourth embodiment of this invention uses a substrate, pile fibers and flocking adhesive each identical with what is used in the first embodiment. For details of the application of the coating of an adhesive, flocking of the pile fibers and the embossing with a high-frequency welder, see the Example described hereinabove.

Figure 9A:
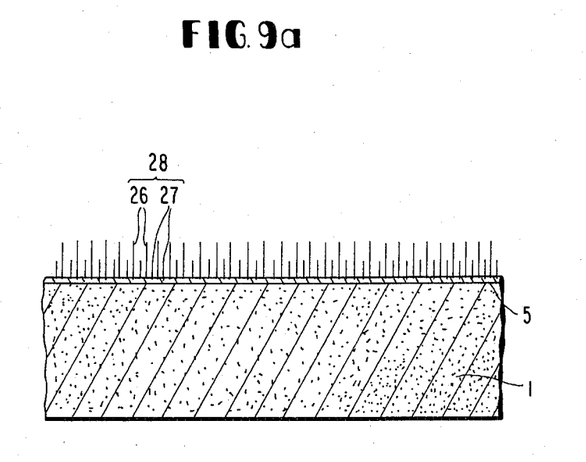
FIG. 9(a) is an enlarged schematic sectional view illustrating yet another example of the flocked foam material to be used in this invention.
Figure 9B:
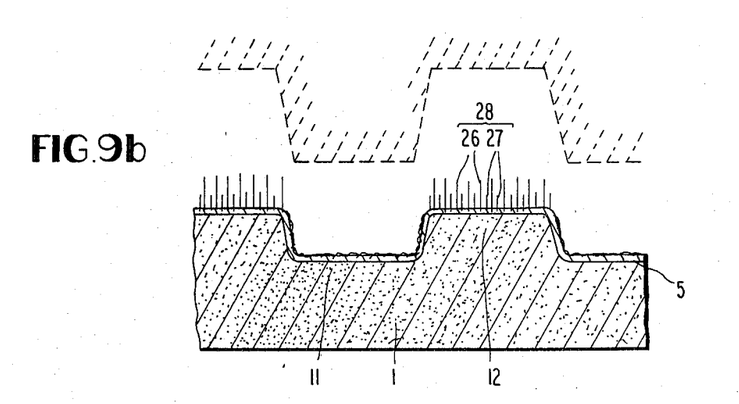
FIG. 9(b) is an enlarged schematic sectional view of the flocked foam prepared from the material of FIG. 9(a).

FIG. 9 shows a fifth embodiment of this invention. FIG. 9(a) shows a flocked foam material which is identical with the material shown in FIG. 8(a) except that short flocks 27 have the same color (hue) as that of the long flocks 26 to provide a surface flock layer having the single color (hue) of the long and short flocks 26 and 27. When such flocked foam material is subjected to embossing with a high-frequency welder, both the flocks 26 and 27 in the recess 11 become flat as they soften to fuse with each other, but those on the ridge 12 remain erect. As a result, the ridge 12 having erect flocks 26 and 27 is velvety and presents a relatively light color (light tone) as they were before the embossing treatment, whereas the recess 11 where the flocks 26 and 27 lie flat presents a deep color (deep tone) due to the high flock density. This way, the recess 11 is sharply distinguished from the ridge 12 on the boundary, providing an embossed pattern with a difference in color depth (different tone) and a clear-cut contour.

The above-described fifth embodiment of this invention uses a substrate, pile fibers and flocking adhesive each identical with what is used in the Example described hereinabove. For details of the application of the coating of an adhesive, flocking of the pile fibers and the embossing with a high-frequency welder, also see that Example.

As described in the foregoing, this invention provides for the first time in the industry an endless flocked foam having good handle and a sharp suede pattern in relief comprising ridges and recesses of different colors (different hues) or of the same color but with different color depth (different tones of the same hue), thus having a great degree of apparent depth. Such foam is produced by embossing a substrate foam of a specified material flocked with fibers of a specified material with a high-frequency welder. Said foam product can be produced on an industrial scale with high efficiency. Modacrylic fibers comprising a vinyl chloride-acrylonitrile copolymer used as the flocking fiber are fire-retardant, and the foam produced using them is suitable for use in construction materials such as wall covering, floor coverings and ceiling coverings, coverings for furniture such as chairs, as well as garments, bags, footwear and other miscellaneous household goods.

It is to be understood that the terminology "embossed pattern, raised pattern or pattern in relief" as used herein is not limited to geometric and non-geometric figures; it includes all types of figures, designs, letters and symbols. It is also to be understood that the flocked foam of this invention is not limited to those specifically illustrated in the accompanying drawings and that various modifications and variations (such as those lined with substrate fabric) can be made without departing from the scope and spirit of the invention.

While the invention has been described in detail and with reference to specific embodiments thereof, it will be apparent to one skilled in the art that various changes and modifications can be made therein without departing from the spirit and scope thereof.

What is claimed is:

1. A flocked foam having an embossed pattern provided by a high-frequency welder, said foam comprising a partially cross-linked foam substrate, having from 10 to 75% gel fraction in boiling toluene for 15 hours formed from (I) a (A) 1,2-polybutadiene resin or (B) a polymer blend, the polymeric components of which are a 1,2-polybutadiene resin as one component thereof and, as a second component thereof, a polymer selected from the group consisting of vinyl acetate/olefinic, vinyl alcohol/olefinic, and acrylic ester/olefinic copolymers containing more than about 10 mol% of polar component, and (II) modacrylic pile fibers consisting of 35% to 85% acrylonitrile and 65% to 15% vinyl chloride flocked on the surface of the foam substrate.

2. A flocked foam according to claim 1, wherein the embossed pattern provided by the high-frequency welder comprises ridges and recesses of the same hue but with different tone.

3. A flocked foam according to claim 1, wherein the embossed pattern provided by the high-frequency welder has deep recesses in the foam substrate.

4. A flocked foam accordance to claim 1 which is flocked with a pile mixture comprising long modacrylic fibers that are capable of being softened to fuse by a high-frequency welder and short modacrylic fibers that are also capable of being softened to fuse and which are of the same or different hue than the long modacrylic fibers.

5. A flocked foam according to claim 4, wherein the long modacrylic fibers and the short modacrylic fibers are of the same hue.

6. A flocked foam according to claim 4, wherein the long modacrylic fibers and the short modacrylic fibers are of different hue.

7. A flocked foam according to claim 4, wherein the embossed pattern provided by the high-frequency welder comprises ridges and recesses having different hue from each other.

8. A flocked foam according to claim 4, wherein the embossed pattern provided by the high frequency welder comprises ridges and recesses having the same hue but different tone.

9. A flocked foam according to claim 1, wherein the embossed pattern provided by a high-frequency welder comprises ridges and recesses having different hues from each other.

10. A flocked foam having an embossed pattern as in claim 1, wherein the ratio of the other polymer: 1,2-polybutadiene resin is from 3:7 to 7:3 by weight.

* * * * *